(12) United States Patent
Ueta

(10) Patent No.: US 10,848,077 B2
(45) Date of Patent: Nov. 24, 2020

(54) POWER RECEIVING DEVICE

(71) Applicant: Yazaki Corporation, Tokyo (JP)

(72) Inventor: Keisuke Ueta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 204 days.

(21) Appl. No.: 16/100,656

(22) Filed: Aug. 10, 2018

(65) Prior Publication Data

US 2019/0068077 A1 Feb. 28, 2019

(30) Foreign Application Priority Data

Aug. 22, 2017 (JP) ................................ 2017-159210

(51) Int. Cl.
| | |
|---|---|
| *H02M 7/219* | (2006.01) |
| *H02M 1/08* | (2006.01) |
| *H02J 50/12* | (2016.01) |

(52) U.S. Cl.
CPC ............ *H02M 7/219* (2013.01); *H02J 50/12* (2016.02); *H02M 1/08* (2013.01)

(58) Field of Classification Search
CPC ........... H02M 7/219; H02M 1/08; H02J 50/12

USPC ......................................................... 307/104
See application file for complete search history.

(56) References Cited

U.S. PATENT DOCUMENTS

| 6,188,592 B1 | 2/2001 | Farrington et al. |
|---|---|---|
| 2015/0003128 A1 | 1/2015 | Otsuka et al. |

FOREIGN PATENT DOCUMENTS

| CN | 104253545 A | 12/2014 |
|---|---|---|
| JP | 4515683 B2 | 8/2010 |

*Primary Examiner* — Hal Kaplan
(74) *Attorney, Agent, or Firm* — Sughrue Mion, PLLC

(57) ABSTRACT

A power receiving device includes a secondary coil, a synchronous rectifier circuit, a smoothing circuit, and a reverse flow suppression circuit. The secondary coil receives the alternate current power wirelessly transmitted from the primary coil. The synchronous rectifier circuit includes a switching element unit that rectifies the alternate current power received by the secondary coil into direct current power. The smoothing circuit smooths the direct current power rectified by the synchronous rectifier circuit. The reverse flow suppression circuit controls the switching element unit. For example, the reverse flow suppression circuit turns off the switching element unit of the synchronous rectifier circuit when a current flowing from the synchronous rectifier circuit to the smoothing circuit is smaller than a predetermined current threshold value.

5 Claims, 13 Drawing Sheets

POWER RECEIVING DEVICE

CROSS-REFERENCE TO RELATED APPLICATION(S)

The present application claims priority to and incorporates by reference the entire contents of Japanese Patent Application No. 2017-159210 filed in Japan on Aug. 22, 2017.

BACKGROUND OF THE INVENTION

1. Field of the Invention

The present invention relates to a power receiving device.

2. Description of the Related Art

Conventionally, there is a wireless power feeding system that wirelessly supplies power. The wireless power feeding system includes a power transmission device that wirelessly transmits power via a primary coil, and a power receiving device that wirelessly receives power transmitted from the power transmission device via a secondary coil. The power receiving device includes a synchronous rectifier circuit that rectifies AC power received via the secondary coil into DC power, and a smoothing circuit that smooths the DC power rectified by the synchronous rectifier circuit. For example, Japanese Patent No. 4515683 B2 discloses a DC-DC converter configured similarly to the above-described wireless power feeding system.

Incidentally, in recent years, it has become more common for the power receiving device to employ a synchronous rectifier circuit using a semiconductor switching element, and in such a case, improvement of synchronous rectification has been desired.

SUMMARY OF THE INVENTION

The present invention has been conceived in view of the above, and an object of the present invention is to provide a power receiving device capable of appropriately performing synchronous rectification.

In order to solve the above mentioned problem and achieve the object, a power receiving device according to one aspect of the present invention includes a secondary coil that receives alternate current power wirelessly transmitted from a primary coil; a synchronous rectifier circuit including a switching element unit that rectifies the alternate current power received by the secondary coil into direct current power; a smoothing circuit that smooths the direct current power rectified by the synchronous rectifier circuit; and a control circuit that controls the switching element unit, wherein the control circuit turns off the switching element unit of the synchronous rectifier circuit when a current flowing from the synchronous rectifier circuit to the smoothing circuit is smaller than a predetermined threshold value.

According to another aspect of the present invention, in the power receiving device, it is preferable that the control circuit includes: a resistor provided between the synchronous rectifier circuit and the smoothing circuit; and a determining circuit that turns off the switching element unit when a current based on a voltage drop of the resistor is smaller than the threshold value.

According to still another aspect of the present invention, in the power receiving device, it is preferable that the synchronous rectifier circuit includes: the switching element unit including a first switching element, a second switching element, a third switching element, and a fourth switching element; and a drive unit including a first driving circuit that drives the first switching element, a second driving circuit that drives the second switching element, a third driving circuit that drives the third switching element, and a fourth driving circuit that drives the fourth switching element, a first series circuit in which the first switching element and the third switching element are connected in series and a second series circuit, positioned closer to the smoothing circuit than the first series circuit, in which the second switching element and the fourth switching element are connected in series and the second switching element is disposed on a side of the first switching element and the fourth switching element is disposed on a side of the third switching element are connected in parallel with the smoothing circuit, a full-bridge circuit is formed in which a first terminal, which is a terminal on one side of the secondary coil, is connected to a connection point of the first switching element and the third switching element and a second terminal, which is a terminal on the other side of the secondary coil, is connected to a connection point of the second switching element and the fourth switching element, and the first terminal is connected to the first driving circuit and the fourth driving circuit and the second terminal is connected to the second driving circuit and the third driving circuit.

In order to achieve the object, a power receiving device according to still another aspect of the present invention includes a secondary coil that receives alternate current power wirelessly transmitted from a primary coil; a synchronous rectifier circuit including a switching element unit that rectifies the alternate current power received by the secondary coil into direct current power; and a smoothing circuit that smooths the direct current power rectified by the synchronous rectifier circuit, wherein the synchronous rectifier circuit includes: the switching element unit including a first switching element, a second switching element, a third switching element, and a fourth switching element; and a drive unit including a first driving circuit that drives the first switching element, a second driving circuit that drives the second switching element, a third driving circuit that drives the third switching element, and a fourth driving circuit that drives the fourth switching element, a first series circuit in which the first switching element and the third switching element are connected in series and a second series circuit, positioned closer to the smoothing circuit than the first series circuit, in which the second switching element and the fourth switching element are connected in series and the second switching element is disposed on a side of the first switching element and the fourth switching element is disposed on a side of the third switching element are connected in parallel with the smoothing circuit, a full-bridge circuit is formed in which a first terminal, which is a terminal on one side of the secondary coil, is connected to a connection point of the first switching element and the third switching element and a second terminal, which is a terminal on the other side of the secondary coil, is connected to a connection point of the second switching element and the fourth switching element, and the first terminal is connected to the first driving circuit and the fourth driving circuit and the second terminal is connected to the second driving circuit and the third driving circuit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a circuit diagram illustrating an operation when a driving circuit according to the embodiment is turned on;

FIG. 6 is a timing chart illustrating the operation when the driving circuit according to the embodiment is turned on;

DETAILED DESCRIPTION OF THE PREFERRED EMBODIMENTS

Figure 1:
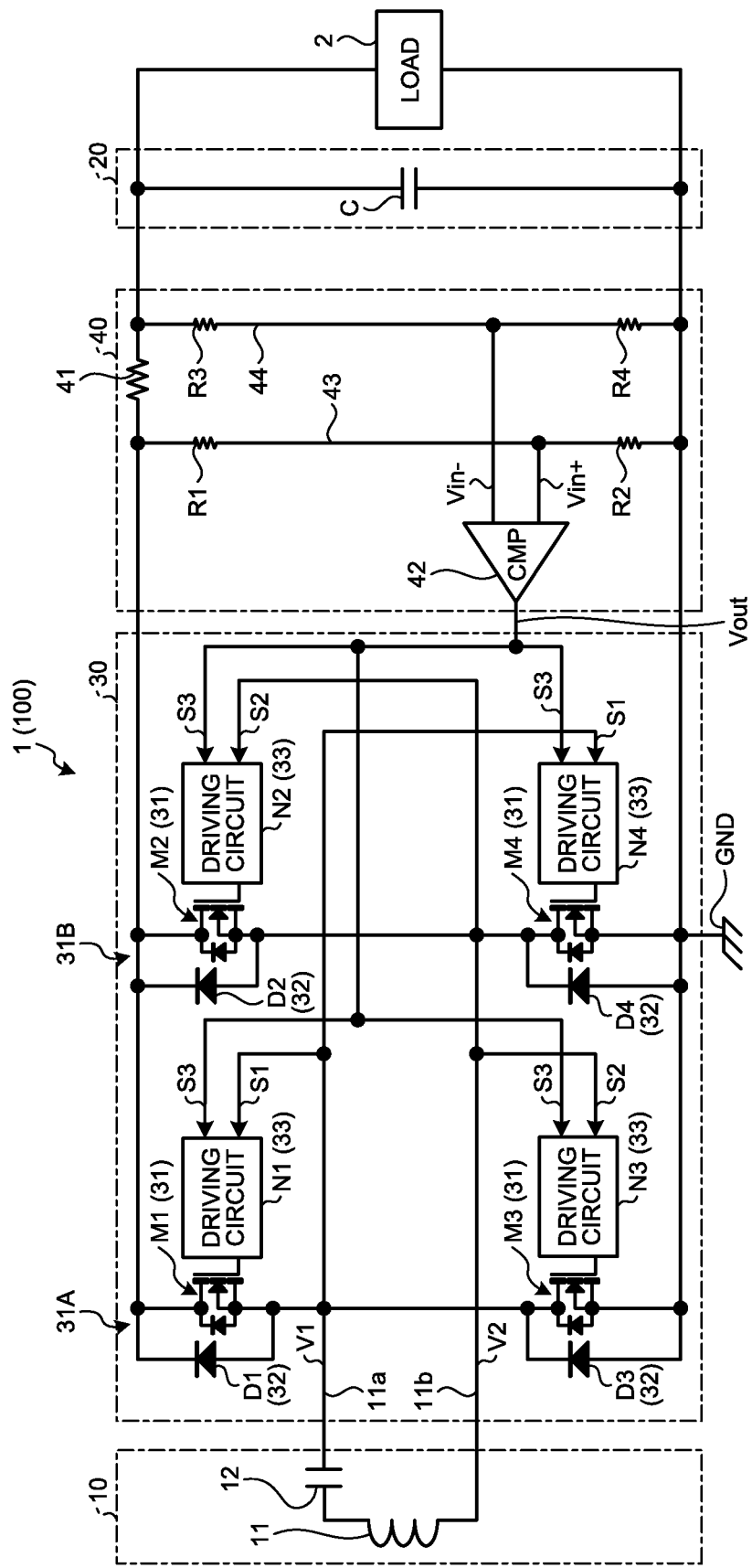
FIG. 1 is a circuit diagram illustrating a configuration of a power receiving device according to an embodiment.

Configurations (embodiments) for embodying the present invention will be described in detail with reference to the accompanying drawings. The present invention is not limited by the contents described in the embodiment below. In addition, constituent elements to be described below include elements that can readily occur to those skilled in the art, and substantially the same elements. Further, configurations to be described below can be combined as needed. Various omissions, substitutions, or changes in the configurations can be made without departing from the gist of the present invention.

Embodiment

A power receiving device 1 according to an embodiment will be described. The power receiving device 1 forms a wireless power feeding system 100 together with a power transmission device (not illustrated). The wireless power feeding system 100 is a system that wirelessly supplies power from the power transmission device to the power receiving device 1. The power receiving device 1 receives AC power transmitted from the power transmission device via a resonant circuit 10, rectifies the received AC power into DC power using a synchronous rectifier circuit 30, and smooths and supplies, to a load 2, the DC power rectified by the synchronous rectifier circuit 30 using a smoothing circuit 20. Hereinafter, the power receiving device 1 will be described in detail.

The power receiving device 1 includes the resonant circuit 10, the smoothing circuit 20, the synchronous rectifier circuit 30, and a reverse flow suppression circuit 40 as a control circuit. The resonant circuit 10 includes a secondary coil 11 and a resonant capacitor 12 serially connected to the secondary coil 11. The secondary coil 11 is provided to face a primary coil of the power transmission device in a non-contact manner and is connected to the synchronous rectifier circuit 30. The resonant circuit 10 receives the AC power transmitted wirelessly (in the non-contact manner) from the primary coil of the power transmission device, and outputs the received AC power to the synchronous rectifier circuit 30.

The smoothing circuit 20 is a circuit that smooths a direct current, which includes a smoothing capacitor C. The smoothing capacitor C is connected in parallel with the synchronous rectifier circuit 30, smooths the direct current (pulsating current) output from the synchronous rectifier circuit 30, and supplies the smoothed DC power to the load 2.

The synchronous rectifier circuit 30 is a circuit that rectifies AC power into DC power. The synchronous rectifier circuit 30 is a full-bridge rectifier circuit, which includes a switching element unit 31, a diode unit 32, and a drive unit 33. The switching element unit 31 includes a first series circuit 31A and a second series circuit 31B. The first series circuit 31A includes a field-effect transistor (FET) M1 as a first switching element, and an FET M3 as a third switching element. The FET M1 and the FET M3 are connected in series. In the first series circuit 31A, for example, a source terminal of the FET M1 and a drain terminal of the FET M3 are connected.

The second series circuit 31B includes an FET M2 as a second switching element, and an FET M4 as a fourth switching element. The FET M2 and the FET M4 are connected in series. In the second series circuit 31B, for example, a source terminal of the FET M2 and a drain terminal of the FET M4 are connected. The second series circuit 31B is positioned closer to the smoothing circuit 20 than the first series circuit 31A. The FET M2 is disposed on the FET M1 side, and the FET M4 is disposed on the FET M3 side. The first series circuit 31A and the second series circuit 31B are connected in parallel with the smoothing circuit 20. In the first series circuit 31A and the second series circuit 31B, for example, a drain terminal of the FET M1 and a drain terminal of the FET M2 are connected to one side of the smoothing circuit 20, and a source terminal of the FET M3 and a source terminal of the FET M4 are connected to the other side of the smoothing circuit 20. Each of the FETs M1 to M4 is, but is not limited to, an N-channel metal-oxide semiconductor field-effect transistor (MOSFET), for example, and may be a P-channel MOSFET, for example.

In the synchronous rectifier circuit 30, a first terminal 11a, which is a terminal on one side of the secondary coil 11, is connected to a connection point of the FET M1 and the FET M3. In the synchronous rectifier circuit 30, for example, the first terminal 11a is connected to a connection point of the source terminal of the FET M1 and the drain terminal of the FET M3. In the synchronous rectifier circuit 30, a second terminal 11b, which is a terminal on the other side of the secondary coil 11, is connected to a connection point of the FET M2 and the FET M4. In the synchronous rectifier circuit 30, for example, the second terminal 11b is connected to a connection point of the source terminal of the FET M2 and the drain terminal of the FET M4.

The diode unit 32 is a circuit that allows a current to flow in a forward direction. The diode unit 32 includes diodes D1 to D4. The diode D1 is connected in parallel with the FET M1. A cathode terminal of the diode D1 is connected to the drain terminal of the FET M1, and an anode terminal of the diode D1 is connected to the source terminal of the FET M1. The diode D2 is connected in parallel with the FET M2. A cathode terminal of the diode D2 is connected to the drain terminal of the FET M2, and an anode terminal of the diode D2 is connected to the source terminal of the FET M2. The diode D3 is connected in parallel with the FET M3. A cathode terminal of the diode D3 is connected to the drain terminal of the FET M3, and an anode terminal of the diode D3 is connected to the source terminal of the FET M3. The diode D4 is connected in parallel with the FET M4. A cathode terminal of the diode D4 is connected to the drain terminal of the FET M4, and an anode terminal of the diode D4 is connected to the source terminal of the FET M4. The synchronous rectifier circuit 30 may not include the diode unit 32. Instead, a body diode incorporated in the FETs M1 to M4 may be substituted.

The drive unit 33 is a circuit that performs on/off control of the FETs M1 to M4 in synchronization with the AC power output to the secondary coil 11. The drive unit 33 includes a driving circuit N1 that drives the FET M1, a driving circuit N2 that drives the FET M2, a driving circuit N3 that drives the FET M3, and a driving circuit N4 that drives the FET M4. In the drive unit 33, the first terminal 11a of the secondary coil 11 is connected to the driving circuit N1 and the driving circuit N4, and the second terminal 11b of the secondary coil 11 is connected to the driving circuit N2 and the driving circuit N3. The drive unit 33 uses, as drive signals S1 and S2, a potential difference to a ground (GND) with respect to input voltages V1 and V2 output from the secondary coil 11. In the drive unit 33, the drive signal S1 is output from the first terminal 11a of the secondary coil 11, and the drive signal S2 is output from the second terminal 11b of the secondary coil 11. The drive unit 33 performs on/off control of the driving circuit N1 and the driving circuit N4 on the basis of the drive signal S1, and performs on/off-control of the driving circuit N2 and the driving circuit N3 on the basis of the drive signal S2.

Figure 2:
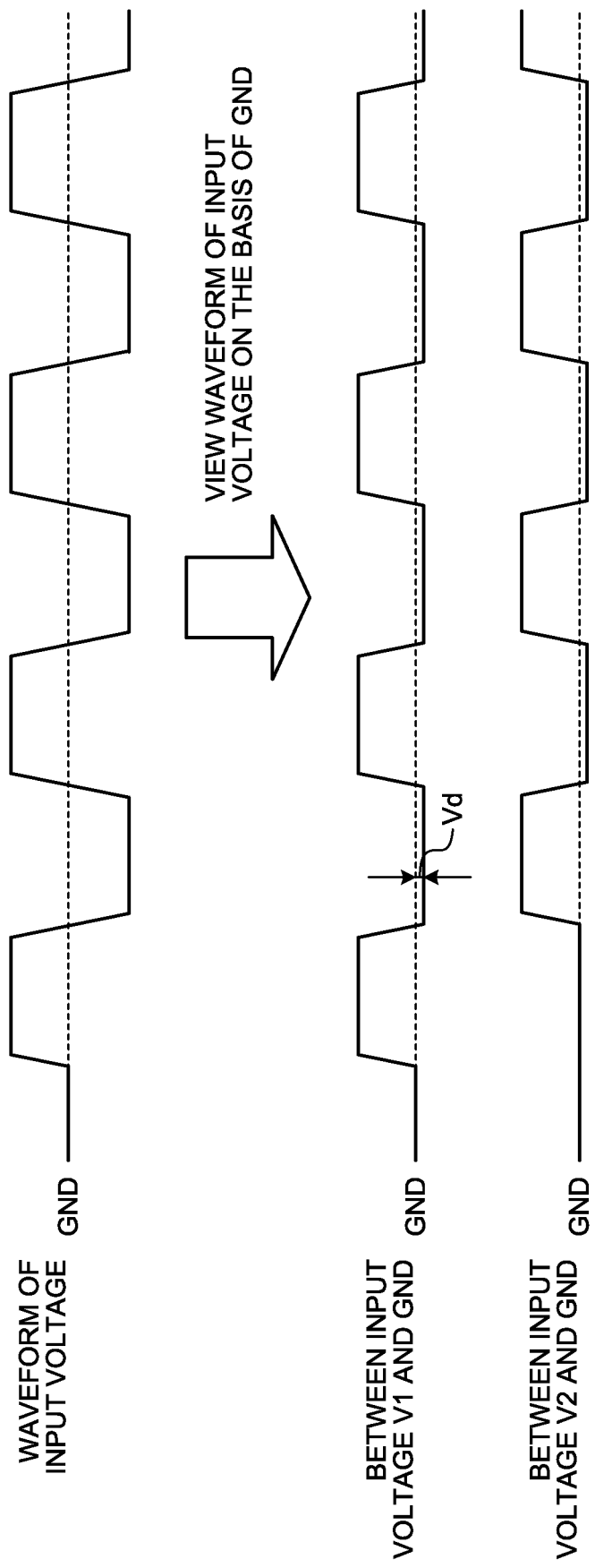
FIG. 2 is a diagram illustrating waveforms of input voltages of the power receiving device according to the embodiment.
Figure 3:
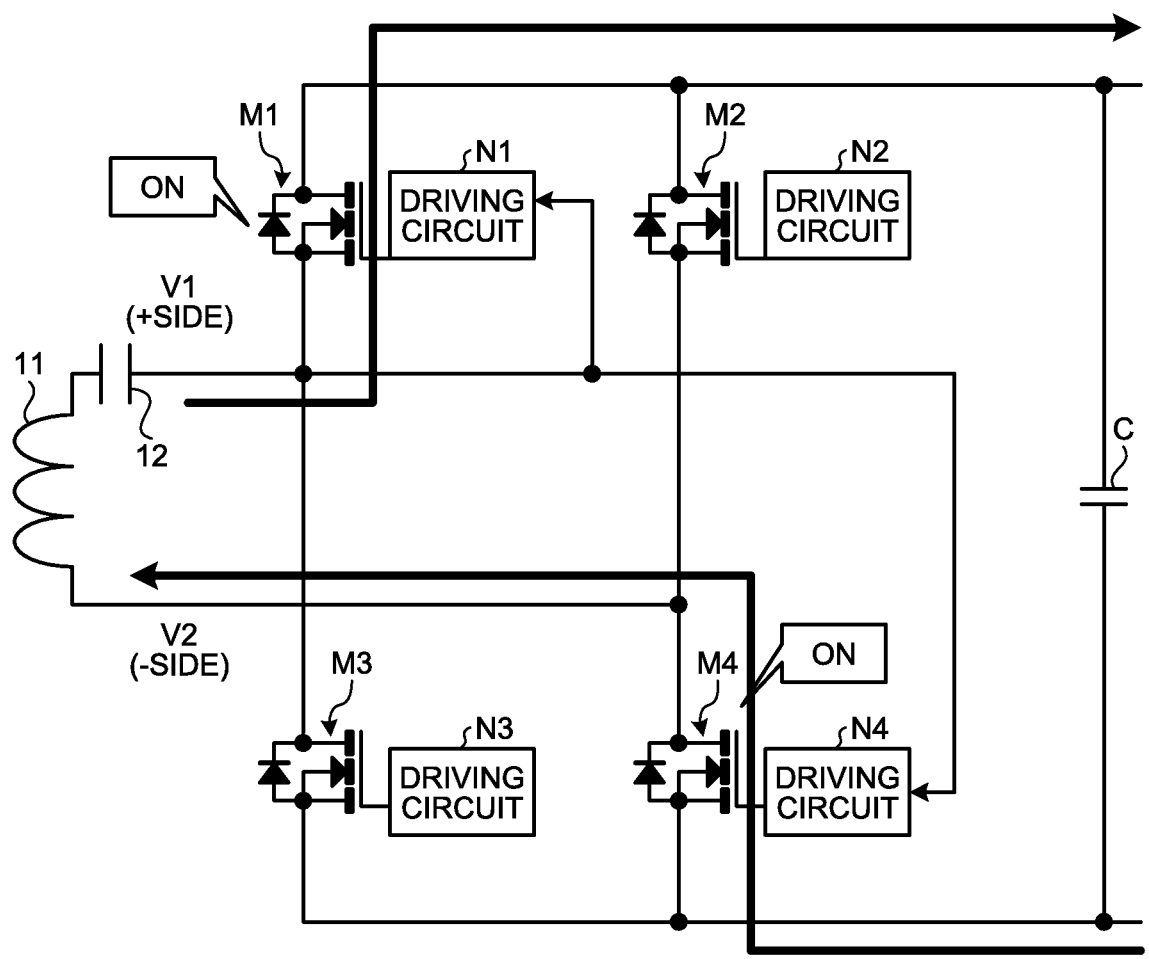
FIG. 3 is a circuit diagram illustrating a rectification operation of the power receiving device according to the embodiment.

Next, operation of the synchronous rectifier circuit 30 will be described. As illustrated in FIG. 2, in the synchronous rectifier circuit 30, waveforms of the input voltages V1 and V2 output from the secondary coil 11 are pulsatile. In this waveform, the input voltage V1 applied to the first terminal 11a and the input voltage V2 applied to the second terminal 11b alternately increase on the basis of the GND. As described above, the synchronous rectifier circuit 30 uses, as the drive signal S1, the potential difference to the GND with respect to the input voltage V1 applied to the first terminal 11a. For example, when the input voltage V1 is equal to or more than a threshold value V1th on the first terminal 11a side, the synchronous rectifier circuit 30 sets a high level (Hi level) drive signal S1 that drives the driving circuits N1 and N4 (see FIG. 10). Further, when the input voltage V1 is smaller than the threshold value V1th, the synchronous rectifier circuit 30 sets a low level (Lo level) drive signal S1 that does not drive the driving circuits N1 and N4. The synchronous rectifier circuit 30 drives and controls the driving circuits N1 and N4 on the basis of the high level or low level drive signal S1. As illustrated in FIG. 3, the synchronous rectifier circuit 30 drives the driving circuits N1 and N4 on the basis of the drive signal S1 (high level) to turn on the FETs M1 and M4, and outputs the current flowing from the first terminal 11a of the secondary coil 11 to a positive electrode of the load 2 via the smoothing circuit 20.

Figure 4:
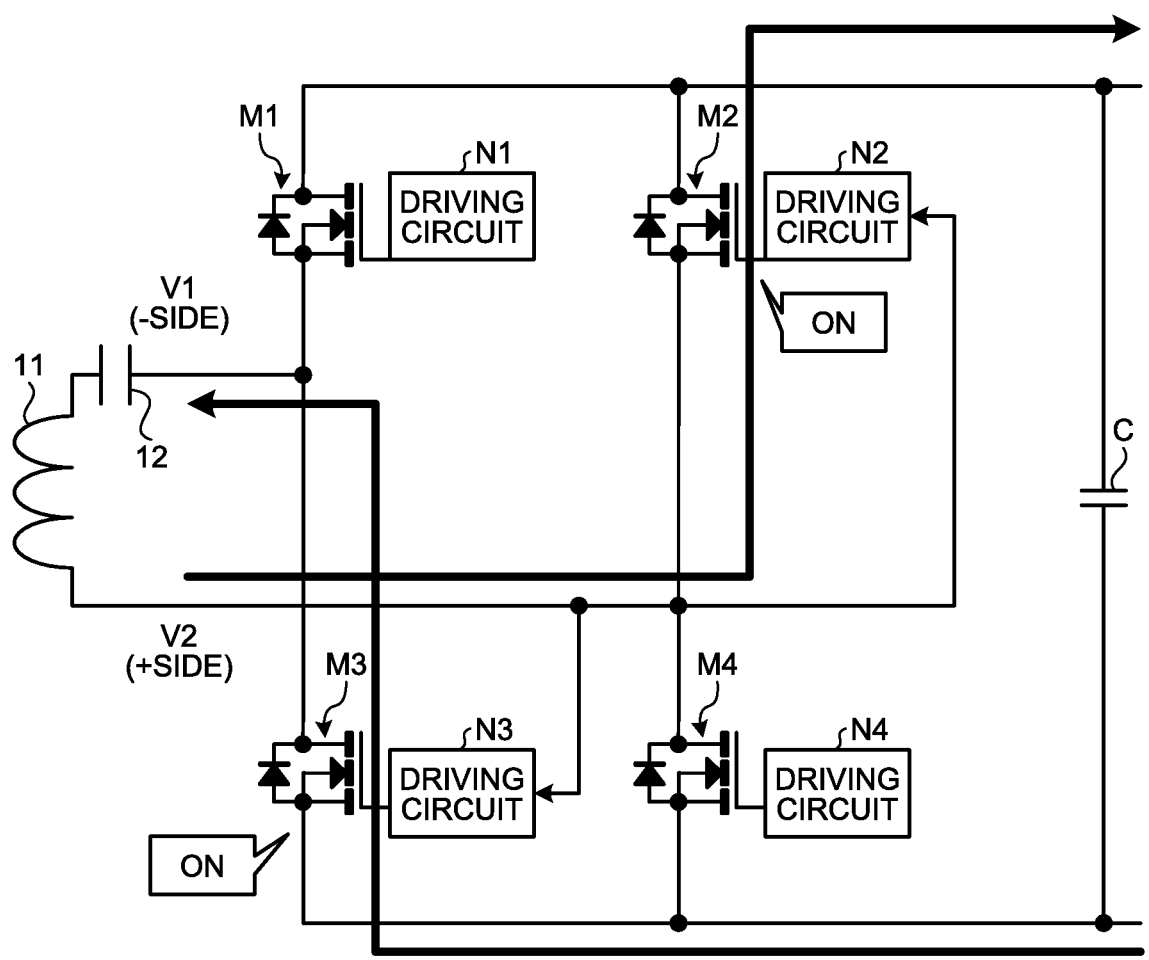
FIG. 4 is another circuit diagram illustrating the rectification operation of the power receiving device according to the embodiment.

The synchronous rectifier circuit 30 uses, as the drive signal S2, the potential difference to the GND with respect to the input voltage V2 applied to the second terminal 11b. For example, when the input voltage V2 is equal to or more than a threshold value V2th on the second terminal 11b side, the synchronous rectifier circuit 30 sets a high level drive signal S2 that drives the driving circuits N2 and N3 (see FIG. 10). Further, when the input voltage V2 is smaller than the threshold value V2th, the synchronous rectifier circuit 30 sets a low level drive signal S2 that does not drive the driving circuits N2 and N3. The synchronous rectifier circuit 30 drives and controls the driving circuits N2 and N3 on the basis of the high level or low level drive signal S2. As illustrated in FIG. 4, the synchronous rectifier circuit 30 drives the driving circuits N2 and N3 on the basis of the drive signal S2 (high level) to turn on the FETs M2 and M3, and outputs the current flowing from the second terminal 11b of the secondary coil 11 to the positive electrode of the load 2 via the smoothing circuit 20. In this manner, the synchronous rectifier circuit 30 turns on the FETs M1 to M4 in accordance with the drive signals S1 and S2 based on the input voltages V1 and V2, which are applied to the first terminal 11a and the second terminal 11b, respectively. In the synchronous rectifier circuit 30, a forward voltage Vd is generated by the diodes D1 to D4 on the basis of the GND (see FIG. 2).

Figure 5:
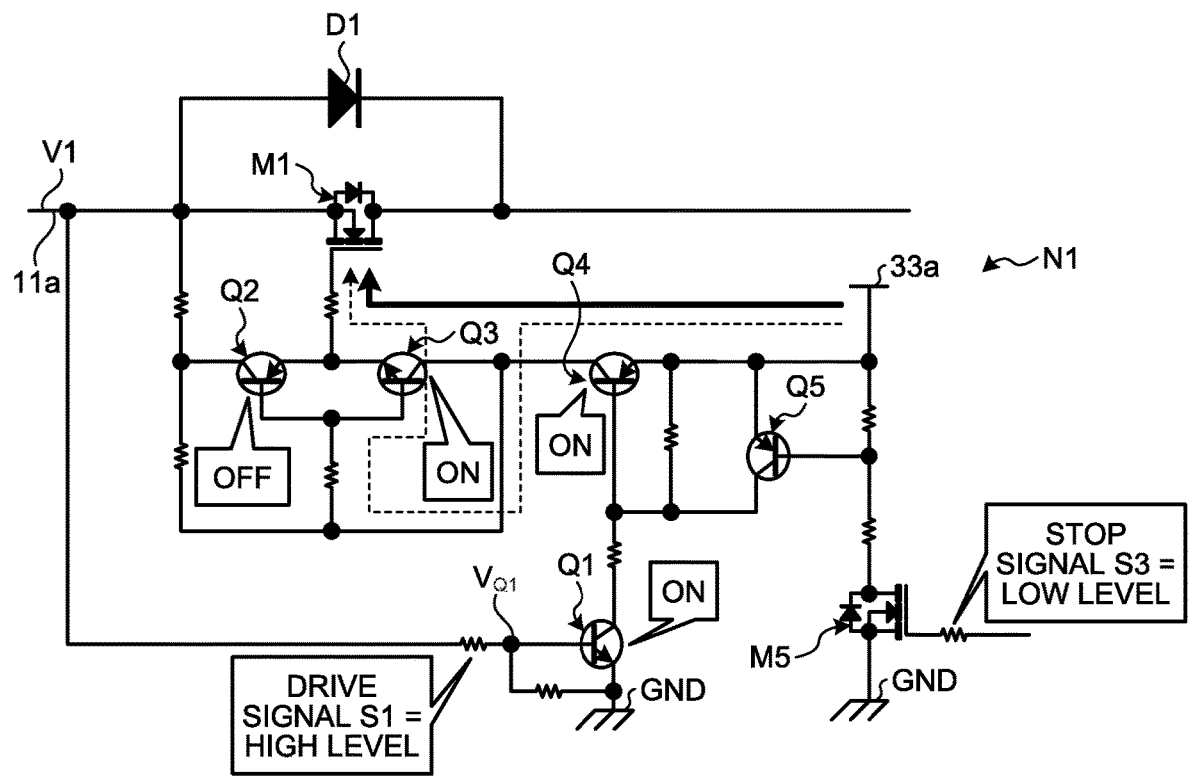

Next, the driving circuits N1 to N4 will be described in detail. Note that, since the driving circuits N1 to N4 have a similar configuration, the driving circuit N1 will be described and the explanation of the driving circuits N2 to N4 will be omitted. As illustrated in FIG. 5, the driving circuit N1 includes a driving power source 33a, a plurality of transistors Q1 and Q3 that are NPN bipolar transistors, a plurality of transistors Q2 and Q4 that are PNP bipolar transistors, and a plurality of resistors. A voltage of the driving power source 33a is higher than the input voltage V1 of the first terminal 11a. A base terminal of the transistor Q1 is connected to the first terminal 11a of the secondary coil 11, an emitter terminal thereof is connected to the GND, and a collector terminal thereof is connected to a base terminal of the transistor Q4. An emitter terminal of the transistor Q4 is connected to the driving power source 33a, and a collector terminal thereof is connected to a base terminal of the transistor Q3. A collector terminal of the transistor Q3 is connected to the collector terminal of the transistor Q4, and an emitter terminal thereof is connected to a gate terminal of the FET M1. A base terminal of the transistor Q2 is connected to the collector terminal of the transistor Q4, an emitter terminal thereof is connected to the gate terminal of the FET M1, and a collector terminal thereof is connected to the source terminal of the FET M1. The respective resistors are appropriately provided between, for example, the transistors Q1 to Q4.

Figure 6:
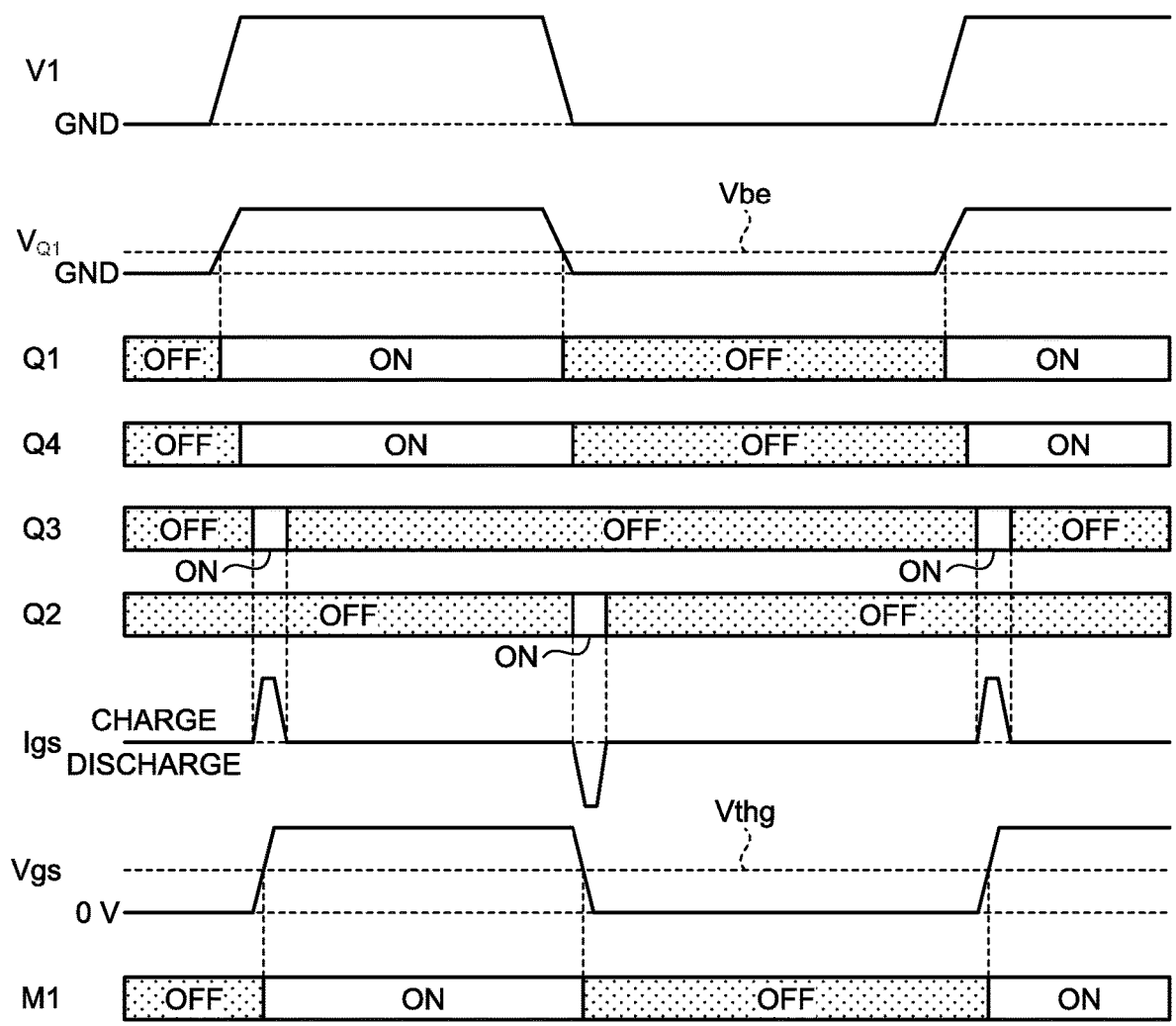

An exemplary case where the FET M1 is turned on by the driving circuit N1 will be described with reference to FIGS. 5 and 6. In the driving circuit N1, the transistor Q1 is turned on when a voltage $V_{Q1}$, which is obtained by dividing the input voltage V1 applied to the first terminal 11a, is equal to or more than a voltage Vbe of the transistor Q1, that is, the drive signal S1 is at the high level. In the driving circuit N1, since the transistor Q1 is turned on and a path in which a current flows is formed, a potential difference is generated between the emitter terminal and the base terminal of the transistor Q4, whereby the transistor Q4 is turned on. When the transistor Q4 is turned on in the driving circuit N1, the voltage of the driving power source 33a is applied to the base terminal of the transistor Q3, whereby the transistor Q3 is turned on. When the transistor Q3 is turned on, the driving circuit N1 allows a gate current Igs to flow into the gate terminal of the FET M1 so that the gate terminal of the FET M1 is charged, whereby a gate voltage Vgs of the FET M1 gradually rises. When the gate voltage Vgs reaches or exceeds a threshold value Vthg, the FET M1 is turned on. When the charging of the gate terminal of the FET M1 is completed in the driving circuit N1, the gate voltage Vgs of the FET M1 is brought closer to the voltage of the driving power source 33a, and the transistor Q3 is turned off. However, since charges are accumulated at the gate terminal of the FET M1, the state where the FET M1 is turned on is maintained.

Figure 7:
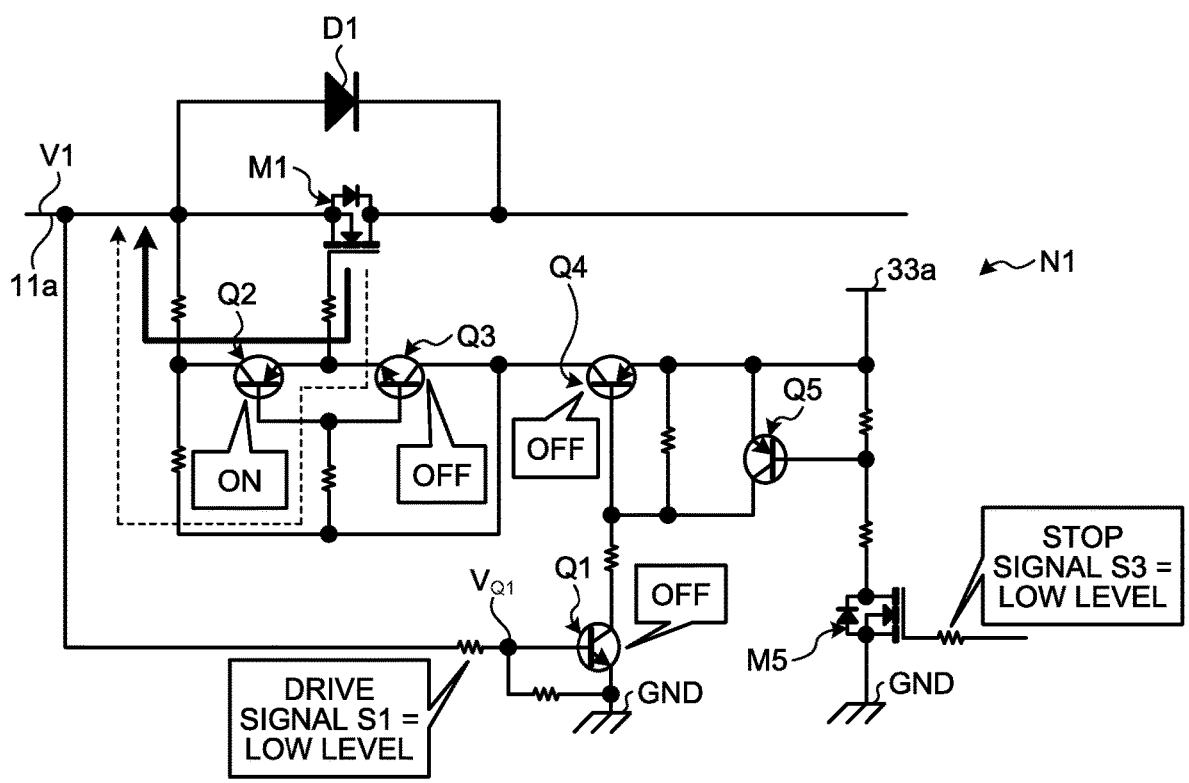
FIG. 7 is a circuit diagram illustrating an operation when the driving circuit according to the embodiment is turned off.

Next, an exemplary case where the FET M1 is turned off by the driving circuit N1 will be described with reference to FIGS. 6 and 7. In the driving circuit N1, the transistor Q1 is turned off when the voltage $V_{Q1}$, which is obtained by dividing the voltage applied to the first terminal 11a, is smaller than the voltage Vbe of the transistor Q1, that is, the drive signal S1 is at the low level. When the transistor Q1 is turned off in the driving circuit N1, the potential difference between the emitter terminal and the base terminal of the transistor Q4 disappears, whereby the transistor Q4 is turned off. When the transistor Q4 is turned off in the driving circuit N1, the voltage of the driving power source 33a is not applied to the base terminal of the transistor Q3, whereby the transistor Q3 is turned off. Further, when the transistor Q4 is turned off in the driving circuit N1, a base voltage of the transistor Q2 drops to the input voltage V1 of the first terminal 11a. Since the gate voltage Vgs of the FET M1 is applied to the emitter terminal of the transistor Q2 in the driving circuit N1, the voltage of the emitter terminal of the transistor Q2 becomes higher than that of the base terminal immediately after the transistor Q4 is turned off. Accordingly, in the driving circuit N1, the current flows between the emitter terminal and the base terminal of the transistor Q2, and the transistor Q2 is turned on. When the transistor Q2 is turned on in the driving circuit N1, the gate terminal and the source terminal of the FET M1 are brought into a connected state, and the charges accumulated at the gate terminal are discharged, whereby the FET M1 is turned off. When the charges of the gate terminal of the FET M1 are discharged in the driving circuit N1, the voltage of the emitter terminal of the transistor Q2 becomes the input voltage V1 of the first terminal 11a, whereby the transistor Q2 is turned off.

Figure 8:
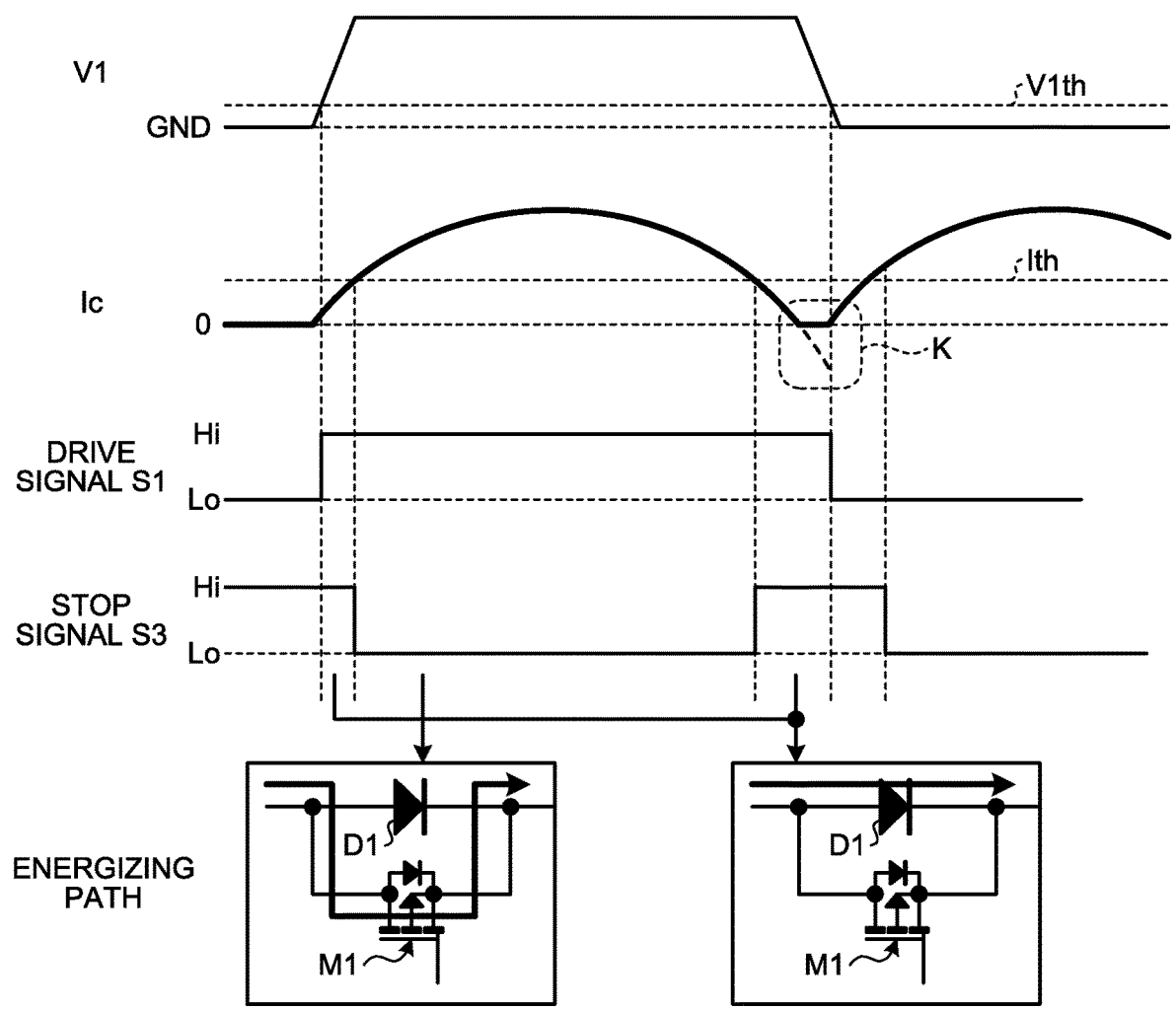
FIG. 8 is a timing chart illustrating reverse flow suppression of the power receiving device according to the embodiment.

Next, the reverse flow suppression circuit 40 of the power receiving device 1 will be described. The reverse flow suppression circuit 40 is a circuit that suppresses a reverse flow of the current from the smoothing circuit 20 to the synchronous rectifier circuit 30 caused by an impedance mismatch between the power transmission device and the power receiving device 1. The reverse flow suppression circuit 40 includes a shunt resistor 41 as a resistor, a comparator 42 as a determining circuit, and a plurality of resistors R1 to R4 (see FIG. 1). The shunt resistor 41 is provided between the synchronous rectifier circuit 30 and the smoothing circuit 20. In the comparator 42, an input terminal $V_{in+}$ of the comparator 42 is connected to a first connecting line 43 that divides, using the resistors R1 and R2, a voltage applied to one end of the shunt resistor 41. Further, in the comparator 42, an input terminal $V_{in-}$ of the comparator 42 is connected to a second connecting line 44 that divides, using the resistors R3 and R4, a voltage applied to the other end of the shunt resistor 41. In the comparator 42, the voltages input to the respective input terminals $V_{in+}$ and $V_{in-}$ are set according to the voltage division by the resistors R1 to R4. In the comparator 42 according to the embodiment, voltage dividing resistors of the voltages input to the input terminals $V_{in+}$ and $V_{in-}$ are set to be similar to each other. In the comparator 42, an output terminal Vout of the comparator 42 is connected to the driving circuits N1 to N4. The comparator 42 determines the current flowing from the synchronous rectifier circuit 30 to the smoothing circuit 20 on the basis of a voltage drop that is a potential difference between both ends of the shunt resistor 41. For example, the comparator 42 compares a detected current Ic (current), which is detected on the basis of the voltage drop of the shunt resistor 41, with a predetermined current threshold value Ith (threshold), and when the detected current Ic is smaller than the current threshold value Ith, the comparator 42 controls the driving circuits N1 to N4 such that the FETs M1 to M4 are turned off (see FIG. 8).

When the detected current Ic is smaller than the current threshold value Ith, the reverse flow suppression circuit 40 outputs a high level stop signal S3 to the FETs M1 to M4 via the driving circuits N1 to N4. Here, the stop signal S3 (high level) is a signal that forcibly turns off the FETs M1 to M4. When the stop signal S3 (high level) is output from the reverse flow suppression circuit 40, the synchronous rectifier circuit 30 turns off the FETs M1 to M4 and allows the current to flow through the diodes D1 and D4 (D2 and D3) serving as energizing paths. At this time, even when the drive signal S1 (high level), which indicates that the FETs M1 to M4 are to be turned on, is output, for example, the synchronous rectifier circuit 30 forcibly turns off the FETs M1 and M4 in accordance with the stop signal S3 (high level) from the reverse flow suppression circuit 40. When the detected current Ic is equal to or more than the current threshold value Ith, the reverse flow suppression circuit 40 outputs the stop signal S3 at a low level. In a case of the stop signal S3 (low level) and the drive signal S1 (high level), for example, the synchronous rectifier circuit 30 turns on the FETs M1 and M4 and allows the current to flow through the FETs M1 and M4 serving as energizing paths. As described above, when the stop signal S3 (high level) is output from the reverse flow suppression circuit 40, that is, when the input voltages V1 and V2 of the secondary coil 11 drop, the synchronous rectifier circuit 30 turns off the FETs M1 to M4 and switches the energizing paths to the diodes D1 to D4. As a result of this switching, even when the input voltages V1 and V2 of the secondary coil 11 drop and the voltage on the side of the smoothing circuit 20 becomes higher than the input voltages V1 and V2 of the secondary coil 11, the synchronous rectifier circuit 30 can suppress a reverse flow of the current from the side of the smoothing circuit 20 to the side of the synchronous rectifier circuit 30 (framed part K in FIG. 8).

Figure 9:
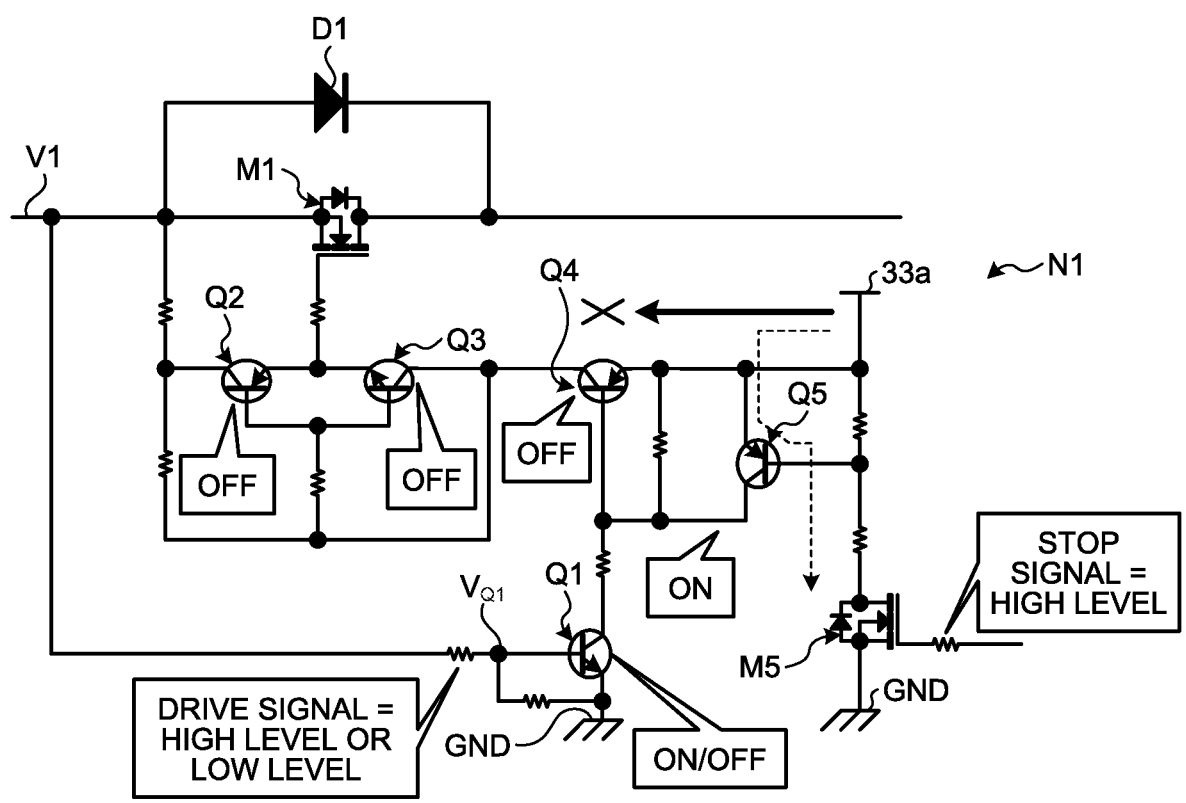
FIG. 9 is a timing chart illustrating a state where the driving circuit according to the embodiment is forcibly stopped.

Next, operation of the driving circuits N1 to N4 based on the stop signal S3 will be described in detail. Note that, since the driving circuits N1 to N4 have a similar configuration, the driving circuit N1 will be described and the explanation of the driving circuits N2 to N4 will be omitted. As illustrated in FIG. 9, the driving circuit N1 further includes an FET M5, and a transistor Q5 that is a PNP bipolar transistor. A gate terminal of the FET M5 is connected to the output terminal Vout of the comparator 42, a drain terminal thereof is connected to the driving power source 33a, and a source terminal thereof is connected to the GND. An emitter terminal of the transistor Q5 is connected to the driving power source 33a, a base terminal thereof is connected to the drain terminal of the FET M5, and a collector terminal thereof is connected to the base terminal of the transistor Q4.

In the driving circuit N1, when the stop signal S3 (high level) is output from the comparator 42 to the gate terminal of the FET M5, the FET M5 is turned on. When the FET M5 is turned on in the driving circuit N1, an energizing path is formed between the driving power source 33a and the GND. Accordingly, a base voltage of the transistor Q5 drops from the voltage of the driving power source 33a by a voltage dividing amount and the potential difference is generated, whereby the transistor Q5 is turned on. When the transistor Q5 is turned on, the driving circuit N1 is fixed in a state where the emitter terminal and the base terminal of the transistor Q4 are short-circuited, and the transistor Q4 is turned off. As a result, in the driving circuit N1, even when the drive signal S1 is at the high level while the FET M5 is turned on in accordance with the stop signal S3 (high level), the transistor Q4 is not turned on, whereby the FET M1 is forcibly turned off in accordance with the stop signal S3 (high level).

Figure 10:
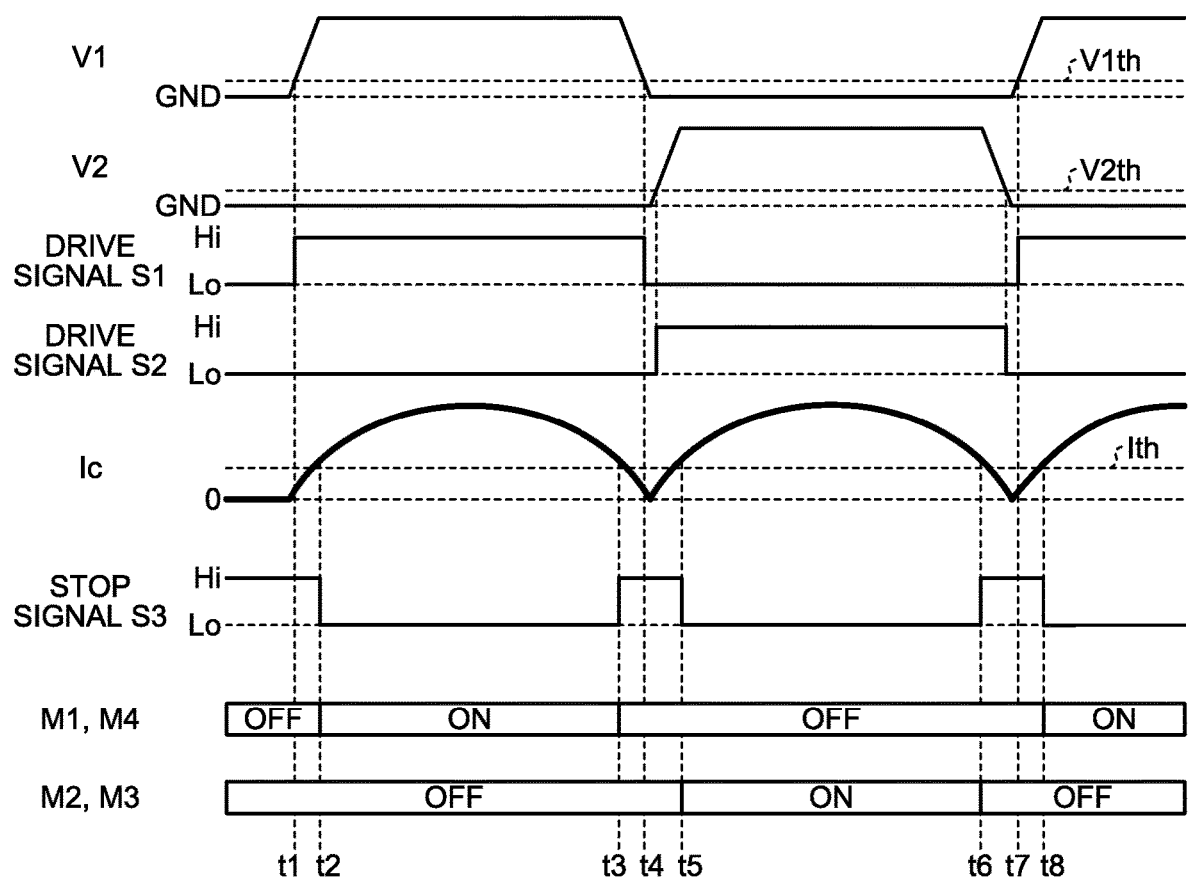
FIG. 10 is a timing chart illustrating a series of operations of the power receiving device according to the embodiment.
Figure 11:
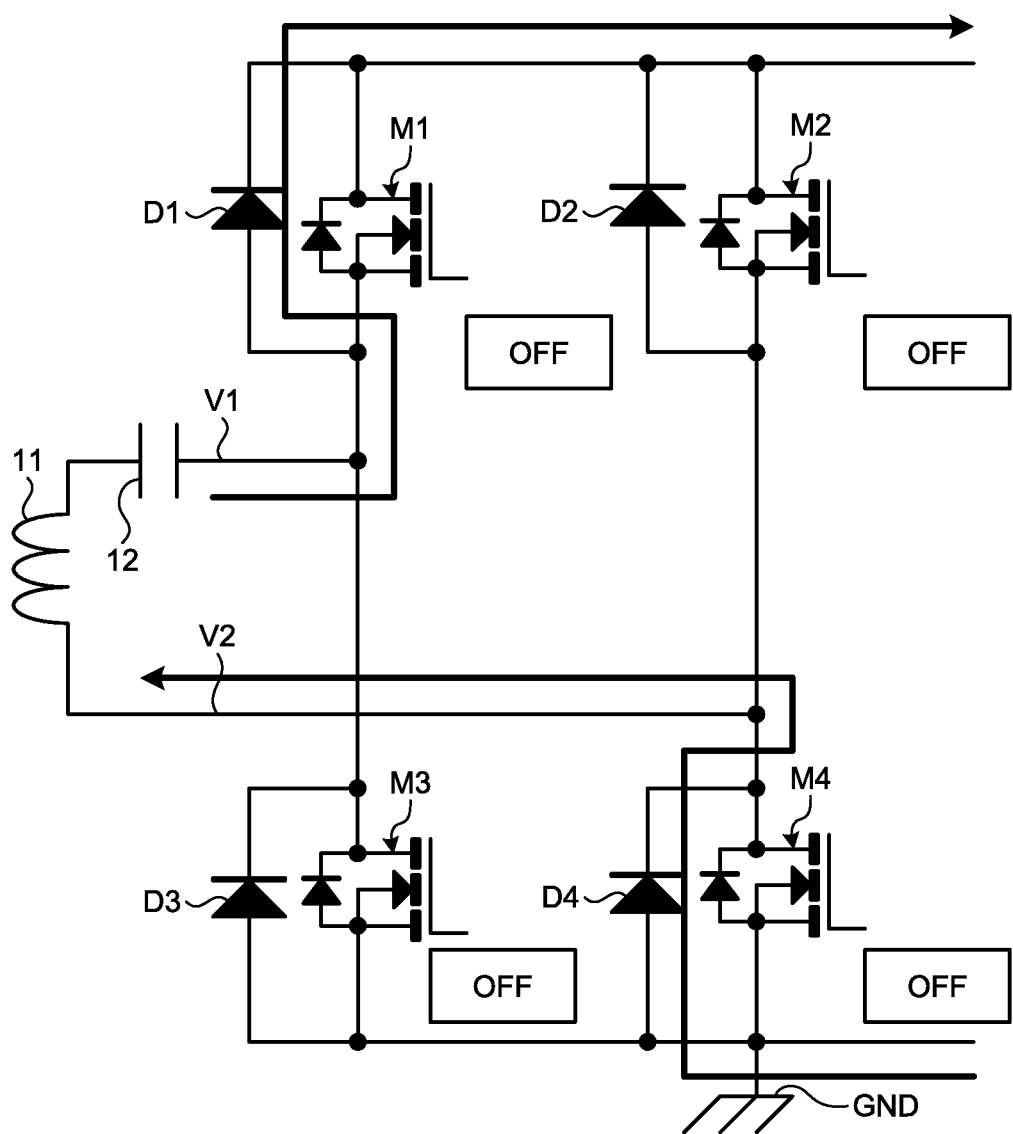
FIG. 11 is a circuit diagram illustrating a rectification operation using a diode of the power receiving device according to the embodiment.
Figure 12:
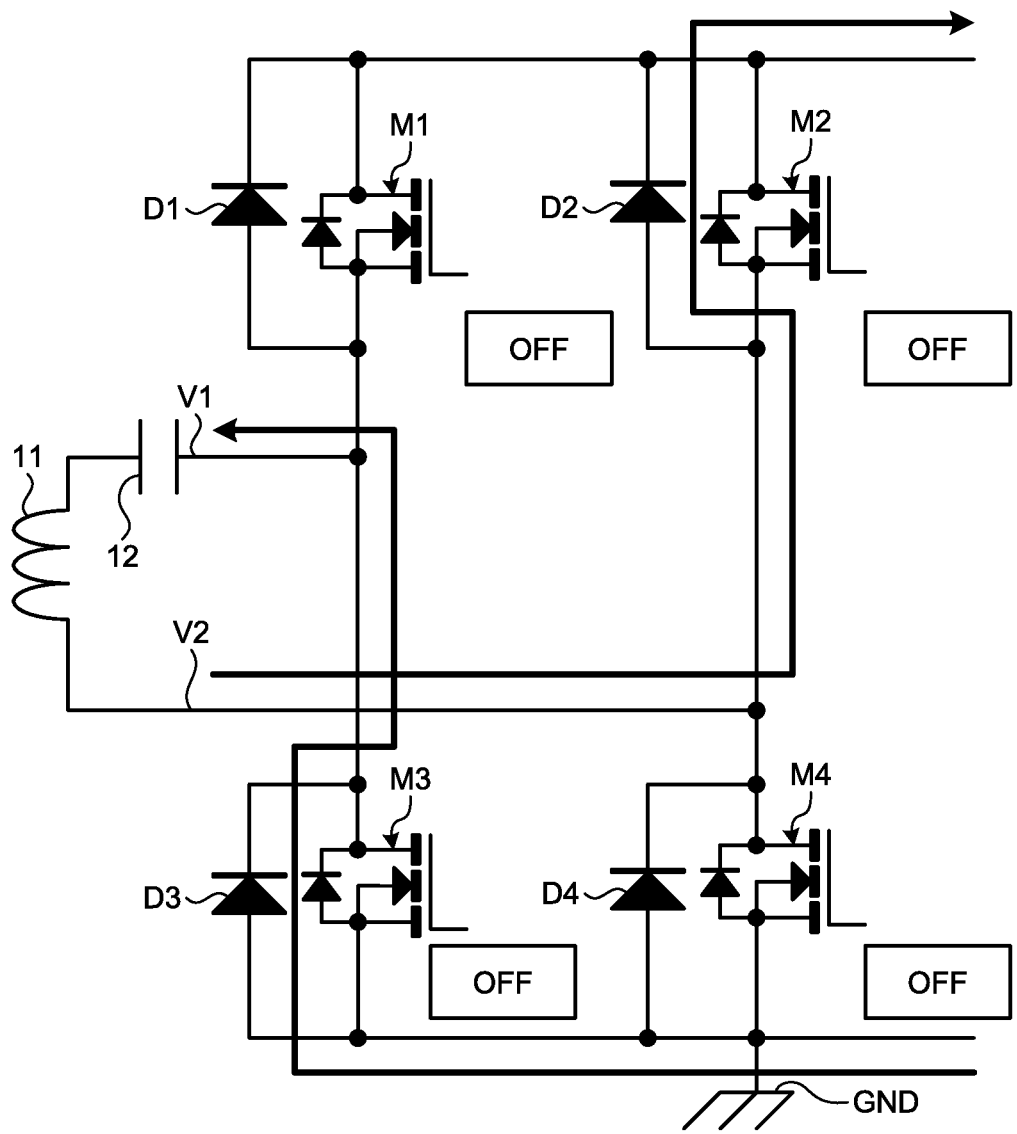
FIG. 12 is another circuit diagram illustrating the rectification operation using the diode of the power receiving device according to the embodiment.

Next, a series of operations of the power receiving device 1 will be described with reference to FIGS. 10 to 12. In a state where power is not supplied to the power receiving device 1 via the primary coil of the power transmission device, the drive signals S1 and S2 are at the low level and the stop signal S3 is at the high level. As a result, the FETs M1 to M4 are in an off state. When power is supplied to the power receiving device 1 via the primary coil of the power transmission device, the input voltage V1 is applied to the first terminal 11a of the secondary coil 11. When the input voltage V1 becomes equal to or more than the threshold value V1th on the side of the first terminal 11a, the synchronous rectifier circuit 30 inputs the high level drive signal S1 (time point t1). At this time, since the detected current Ic is smaller than the current threshold value Ith and the stop signal S3 is at the high level, the synchronous rectifier circuit 30 does not turn on the FETs M1 and M4 and maintains the off state thereof, whereby the current flows through the diodes D1 and D4 (see FIG. 11). In the synchronous rectifier circuit 30, when the detected current Ic becomes equal to or more than the current threshold value Ith at a time point t2, the stop signal S3 changes from the high level to the low level. As a result, the FETs M1 and M4 are turned on, and the current flows in the synchronous rectifier circuit 30 through the FETs M1 and M4 (see FIG. 3). When the input voltage V1 of the first terminal 11a drops and the detected current Ic becomes smaller than the current threshold value Ith, the synchronous rectifier circuit 30 inputs the high level stop signal S3 (time point t3). As a result, the synchronous rectifier circuit 30 turns off the FETs M1 and M4, and the current flows through the diodes D1 and D4 (see FIG. 11). When the input voltage V1 becomes smaller than the threshold value V1th on the first terminal 11a side, the synchronous rectifier circuit 30 inputs the low level drive signal S1 (time point t4).

When the input voltage V2 becomes equal to or more than the threshold value V2th on the side of the second terminal 11b, the synchronous rectifier circuit 30 inputs the high level drive signal S2. At this time, since the detected current Ic is smaller than the current threshold value Ith and the stop signal S3 is at the high level, the synchronous rectifier circuit 30 does not turn on the FETs M2 and M3 and maintains the off state thereof, whereby the current flows through the diodes D2 and D3 (see FIG. 12). When the detected current Ic becomes equal to or more than the current threshold value Ith at a time point t5, the synchronous rectifier circuit 30 inputs the low level stop signal S3. As a result, the FETs M2 and M3 are turned on, and the current flows in the synchronous rectifier circuit 30 through the FETs M2 and M3 (see FIG. 4). When the input voltage V2 of the second terminal 11b drops and the detected current Ic becomes smaller than the current threshold value Ith, the synchronous rectifier circuit 30 inputs the high level stop signal S3 (time point t6). As a result, the synchronous rectifier circuit 30 turns off the FETs M2 and M3, and the current flows through the diodes D2 and D3 (see FIG. 12). When the input voltage V2 becomes smaller than the threshold value V2th on the side of the second terminal 11b, the synchronous rectifier circuit 30 inputs the low level drive signal S2. The synchronous rectifier circuit 30 inputs the high level drive signal S1 (time point t7) when the input voltage V1 becomes equal to or more than the threshold value V1th on the side of the first terminal 11a, inputs the low level stop signal S3 (time point t8) when the detected current Ic becomes equal to or more than the current threshold value Ith, and turns on the FETs M1 and M4 so that the current flows through the FETs M1 and M4. In this manner, the synchronous rectifier circuit 30 turns on/off the FETs M1 to M4 on the basis of the drive signals S1 and S2 and the stop signal S3.

As described above, the power receiving device 1 according to the embodiment includes the secondary coil 11, the synchronous rectifier circuit 30, the smoothing circuit 20, and the reverse flow suppression circuit 40. The secondary coil 11 receives the AC power wirelessly transmitted from the primary coil. The synchronous rectifier circuit 30 includes the switching element unit 31 that rectifies the AC power received by the secondary coil 11 into DC power. The smoothing circuit 20 smooths the DC power rectified by the synchronous rectifier circuit 30. The reverse flow suppression circuit 40 controls the switching element unit 31. For example, the reverse flow suppression circuit 40 turns off the switching element unit 31 of the synchronous rectifier circuit 30 when the detected current Ic flowing from the synchronous rectifier circuit 30 to the smoothing circuit 20 is smaller than the predetermined current threshold value Ith.

As described above, when the input voltages V1 and V2 of the secondary coil 11 drop, the power receiving device 1 turns off the switching element unit 31 of the synchronous rectifier circuit 30. With this configuration, even when the voltage on the side of the smoothing circuit 20 becomes larger than the input voltages V1 and V2 of the secondary coil 11, the power receiving device 1 can suppress a reverse flow of the current from the smoothing circuit 20 to the synchronous rectifier circuit 30. This suppression allows the power receiving device 1 to suppress a decrease in power transmission efficiency and to perform synchronous rectification appropriately. Moreover, since the rectification is performed using FETs M1 to M4, the power receiving device 1 can suppress a conduction loss compared to a case where the rectification is performed using a conventional diode.

In the power receiving device 1 described above, the reverse flow suppression circuit 40 includes the shunt resistor 41, and the comparator 42. The shunt resistor 41 is provided between the synchronous rectifier circuit 30 and the smoothing circuit 20. When the detected current Ic, which is detected on the basis of the voltage drop of the shunt resistor 41, is smaller than the current threshold value Ith, the comparator 42 turns off the switching element unit 31. With this configuration, the power receiving device 1 can suppress the reverse flow of the current from the smoothing circuit 20 to the synchronous rectifier circuit 30.

In the power receiving device 1, the synchronous rectifier circuit 30 includes the switching element unit 31 and the drive unit 33. The switching element unit 31 includes the FET M1, the FET M2, the FET M3, and the FET M4. The drive unit 33 includes the driving circuit N1 that drives the FET M1, the driving circuit N2 that drives the FET M2, the driving circuit N3 that drives the FET M3, and the driving circuit N4 that drives the FET M4. The synchronous rectifier circuit 30 forms the first series circuit 31A in which the FET M1 and the FET M3 are connected in series. The synchronous rectifier circuit 30 forms the second series circuit 31B positioned closer to the smoothing circuit 20 than the first series circuit 31A. In the second series circuit 31B, the FET M2 and the FET M4 are connected in series, the FET M2 is disposed on the FET M1 side, and the FET M4 is disposed on the FET M3 side. In the synchronous rectifier circuit 30, the first series circuit 31A and the second series circuit 31B are connected in parallel with the smoothing circuit 20. The synchronous rectifier circuit 30 forms a full-bridge circuit in which the first terminal 11a, which is the terminal on one side of the secondary coil 11, is connected to the connection point of the FET M1 and the FET M3, and the second terminal 11b, which is the terminal on the other side of the secondary coil 11, is connected to the connection point of the FET M2 and the FET M4. In the synchronous rectifier circuit 30, the first terminal 11a of the secondary coil 11 is connected to the driving circuit N1 and the driving circuit N4, and the second terminal 11b of the secondary coil 11 is connected to the driving circuit N2 and the driving circuit N3.

With this configuration, the power receiving device 1 can drive the FETs M1 to M4 of the synchronous rectifier circuit 30 using the input voltages V1 and V2 applied to the first terminal 11a and the second terminal 11b of the secondary coil 11. With this configuration, the power receiving device 1 is not required to, for example, receive the drive signal that drives the FETs M1 to M4 from a transmitting side as in a conventional manner, whereby a configuration of the device can be simplified, and a manufacturing cost can be suppressed. As a result, the power receiving device 1 can perform the synchronous rectification appropriately.

Variation

Figure 13:
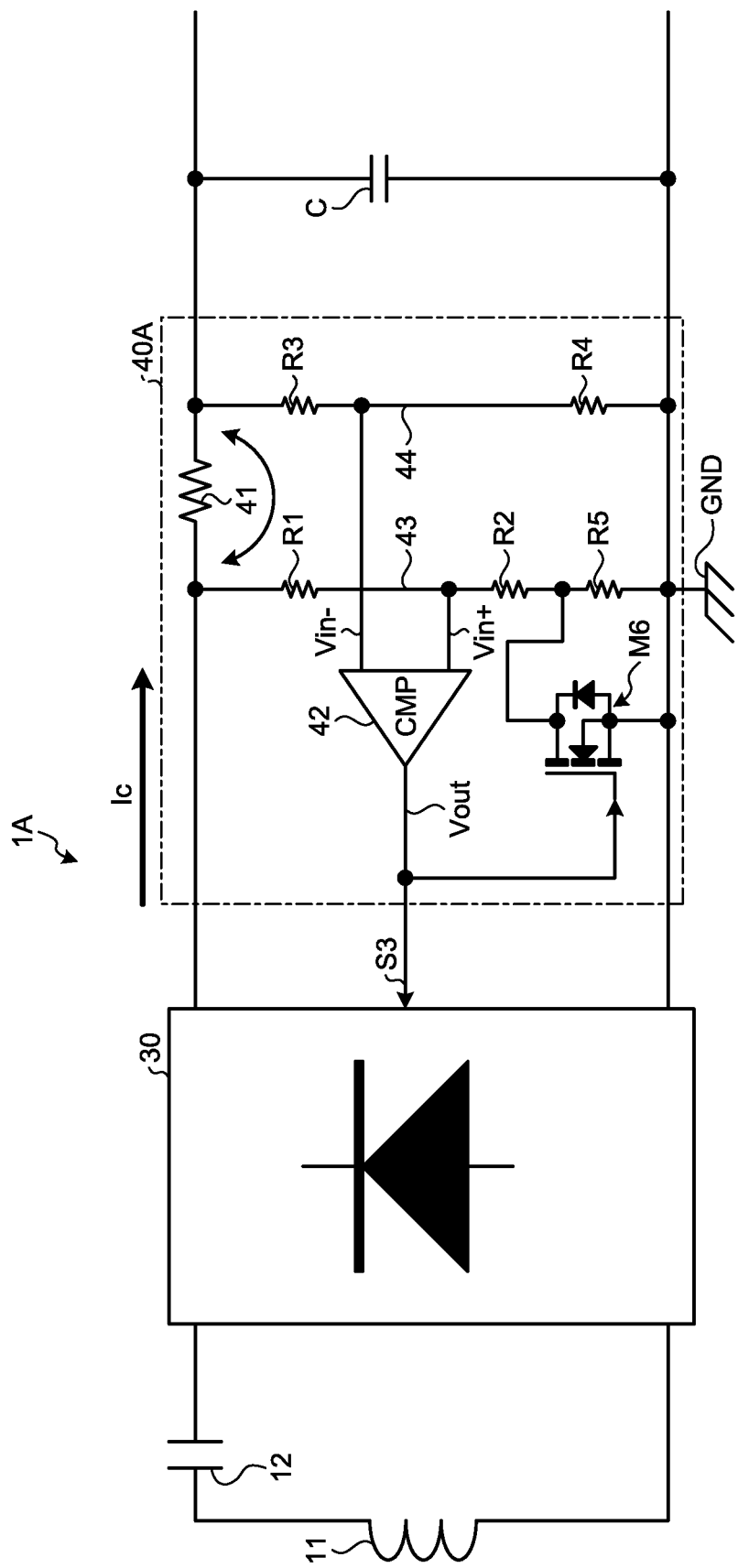
FIG. 13 is a circuit diagram illustrating a configuration of a reverse flow suppression circuit according to a variation of the embodiment.

Next, a variation of the embodiment will be described. Note that, in the variation, constituent elements similar to those in the embodiment are denoted by identical reference signs, and detailed descriptions thereof will be omitted. In the embodiment, a voltage dividing resistor applied to respective input terminals $V_{in+}$ is fixed in a reverse flow suppression circuit 40. However, the voltage dividing resistor may be changed at a time of rising of a detected current Ic and falling of the detected current Ic. As illustrated in FIG. 13, a reverse flow suppression circuit 40A of a power receiving device 1A according to the variation includes, for example, three resistors R1, R2, and R5 connected in series to a first connecting line 43, and an FET M6 that switches connection relations of the respective resistors R1, R2, and R5. In the reverse flow suppression circuit 40A, a gate terminal of the FET M6 is connected to an output terminal Vout of a comparator 42, a drain terminal thereof is connected between the resistors R2 and R5, and a source terminal thereof is connected to a GND.

In the reverse flow suppression circuit 40A, when a high level stop signal S3 is input from the output terminal Vout to the gate terminal of the FET M6 and the FET M6 is turned on, the resistor R2 is connected to the GND without passing through the resistor R5. As a result, the voltage dividing resistor of the voltage applied to the input terminal $V_{in+}$ of the comparator 42 can be changed in the reverse flow suppression circuit 40A to exhibit hysteresis, whereby respective threshold values of the rising and the falling of the detected current Ic can be separately changed.

A power receiving device according to the embodiment turns off a switching element unit of a synchronous rectifier circuit when a current flowing from the synchronous rectifier circuit to a smoothing circuit is smaller than a predetermined threshold value. With this configuration, even when a voltage on the side of the smoothing circuit becomes larger than an input voltage of a secondary coil, the power receiving device can suppress a reverse flow of the current from the smoothing circuit to the synchronous rectifier circuit. Further, in the power receiving device, a first terminal, which is a terminal on one side of the secondary coil, is connected to a first driving circuit and a fourth driving circuit, and a second terminal, which is a terminal on the other side of the secondary coil, is connected to a second driving circuit and a third driving circuit. With this configuration, the power receiving device is not required to, for example, receive a drive signal that drives the synchronous rectifier circuit from a transmitting side as in a conventional manner, whereby a configuration of the device can be simplified. Accordingly, the power receiving device can perform the synchronous rectification appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power receiving device, comprising:
   a secondary coil that receives alternating current power wirelessly transmitted from a primary coil;
   a synchronous rectifier circuit including a switching element unit that rectifies the alternating current power received by the secondary coil into direct current power;
   a smoothing circuit that smooths the direct current power rectified by the synchronous rectifier circuit; and
   a control circuit that controls the switching element unit, wherein
   the control circuit turns off the switching element unit of the synchronous rectifier circuit when a current flowing from the synchronous rectifier circuit to the smoothing circuit is smaller than a predetermined threshold value.

2. The power receiving device according to claim 1, wherein
   the control circuit includes:
   a resistor provided between the synchronous rectifier circuit and the smoothing circuit; and
   a determining circuit that turns off the switching element unit when a current based on a voltage drop of the resistor is smaller than the threshold value.

3. The power receiving device according to claim 2, wherein
   the synchronous rectifier circuit includes:
   the switching element unit including a first switching element, a second switching element, a third switching element, and a fourth switching element; and
   a drive unit including a first driving circuit that drives the first switching element, a second driving circuit that drives the second switching element, a third driving circuit that drives the third switching element, and a fourth driving circuit that drives the fourth switching element, a first series circuit in which the first switching element and the third switching element are connected in series and a second series circuit, positioned closer to the smoothing circuit than the first series circuit, in which the second switching element and the fourth switching element are connected in series and the second switching element is disposed on a side of the first switching element and the fourth switching element is disposed on a side of the third switching element are connected in parallel with the smoothing circuit, a full-bridge circuit is formed in which a first terminal, which is a terminal on one side of the secondary coil, is connected to a connection point of the first switching element and the third switching element and a second terminal, which is a terminal on the other side of the secondary coil, is connected to a connection point of the second switching element and the fourth switching element, and the first terminal is connected to the first driving circuit and the fourth driving circuit and the second terminal is connected to the second driving circuit and the third driving circuit.

4. The power receiving device according to claim 1, wherein
the synchronous rectifier circuit includes:
the switching element unit including a first switching element, a second switching element, a third switching element, and a fourth switching element; and
a drive unit including a first driving circuit that drives the first switching element, a second driving circuit that drives the second switching element, a third driving circuit that drives the third switching element, and a fourth driving circuit that drives the fourth switching element,
a first series circuit in which the first switching element and the third switching element are connected in series and a second series circuit, positioned closer to the smoothing circuit than the first series circuit, in which the second switching element and the fourth switching element are connected in series and the second switching element is disposed on a side of the first switching element and the fourth switching element is disposed on a side of the third switching element are connected in parallel with the smoothing circuit, a full-bridge circuit is formed in which a first terminal, which is a terminal on one side of the secondary coil, is connected to a connection point of the first switching element and the third switching element and a second terminal, which is a terminal on the other side of the secondary coil, is connected to a connection point of the second switching element and the fourth switching element, and the first terminal is connected to the first driving circuit and the fourth driving circuit and the second terminal is connected to the second driving circuit and the third driving circuit.

5. A power receiving device, comprising:
a secondary coil that receives alternating current power wirelessly transmitted from a primary coil;
a synchronous rectifier circuit including a switching element unit that rectifies the alternating current power received by the secondary coil into direct current power; and
a smoothing circuit that smooths the direct current power rectified by the synchronous rectifier circuit, wherein
the synchronous rectifier circuit includes:
the switching element unit including a first switching element, a second switching element, a third switching element, and a fourth switching element; and
a drive unit including a first driving circuit that drives the first switching element, a second driving circuit that drives the second switching element, a third driving circuit that drives the third switching element, and a fourth driving circuit that drives the fourth switching element,
a first series circuit in which the first switching element and the third switching element are connected in series and a second series circuit, positioned closer to the smoothing circuit than the first series circuit, in which the second switching element and the fourth switching element are connected in series and the second switching element is disposed on a side of the first switching element and the fourth switching element is disposed on a side of the third switching element are connected in parallel with the smoothing circuit, a full-bridge circuit is formed in which a first terminal, which is a terminal on one side of the secondary coil, is connected to a connection point of the first switching element and the third switching element and a second terminal, which is a terminal on the other side of the secondary coil, is connected to a connection point of the second switching element and the fourth switching element, and the first terminal is connected to the first driving circuit and the fourth driving circuit and the second terminal is connected to the second driving circuit and the third driving circuit.

* * * * *